United States Patent [19]

Tominaga et al.

[11] Patent Number: 4,802,883
[45] Date of Patent: Feb. 7, 1989

[54] METHOD OF AND APPARATUS FOR ADJUSTING TENSION OF TIMING BELT

[75] Inventors: Kanji Tominaga; Toshihiro Hijikata; Katsuhiro Yamaguchi; Yoshimichi Matsumoto; Yasuo Watanabe, all of Sayama, Japan

[73] Assignee: Honda Giken Kogyo Kabushiki Kaisha, Tokyo, Japan

[21] Appl. No.: 107,311

[22] Filed: Oct. 13, 1987

[30] Foreign Application Priority Data

Oct. 13, 1986 [JP] Japan .................................. 61-241288
Aug. 7, 1987 [JP] Japan .................................. 62-196465

[51] Int. Cl.⁴ ............................................. F16H 7/10
[52] U.S. Cl. ..................................... 474/101; 474/113
[58] Field of Search ....................... 474/101, 109–111, 474/113–115, 117, 118, 133–138

[56] References Cited

U.S. PATENT DOCUMENTS 4,459,123 7/1984 Tatsunaka et al. ............. 474/101 X
4,478,595 10/1984 Hayakawa et al. ............. 474/110 X

FOREIGN PATENT DOCUMENTS 164607 8/1985 Japan .

Primary Examiner—Thuy M. Bui
Attorney, Agent, or Firm—Armstrong, Nikaido, Marmelstein & Kubovcik

[57] ABSTRACT

Method and apparatus for adjusting tension on a timing belt of an engine. The engine includes a driving pulley on its crankshaft, a driven pulley on its camshaft, an auxiliary pulley, a timing belt bridging over the pulleys and a tension pulley pressing against the belt at one side. The driving pulley is first reversely rotated while the driven pulley is held fixed in position thereby tensioning the portion of the belt between the auxiliary pulley and the driven pulley. The driving pulley is then rotated normally to overtension the tension side portion of the belt while the tension pulley is advanced to take up any slack. Thereafter, the tension pulley is retracted while the driving pulley is reversely rotated until deflection of the tension side portion of the belt reaches a predetermined target adjustment value. The tension pulley is then fixed in position.

26 Claims, 15 Drawing Sheets

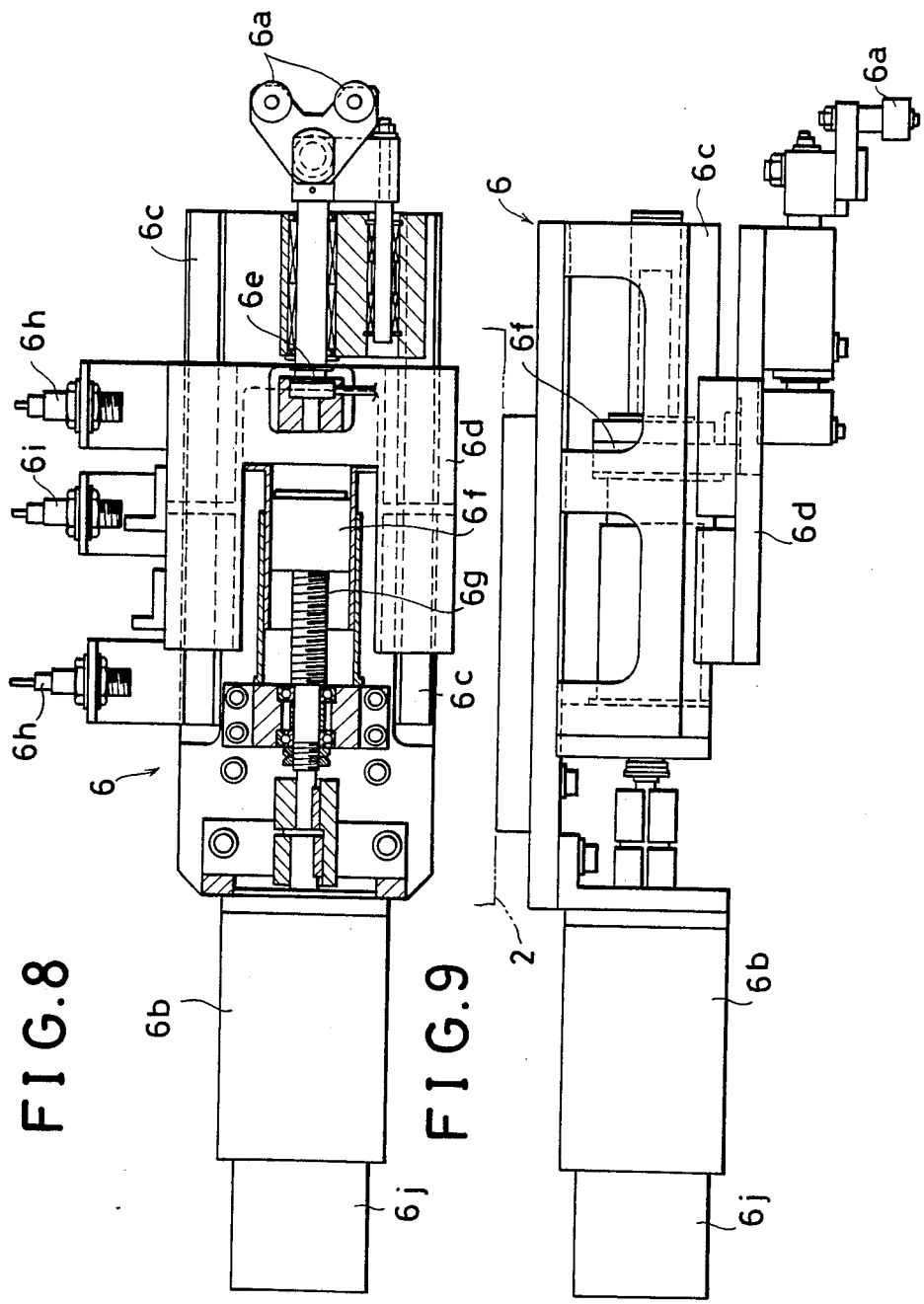

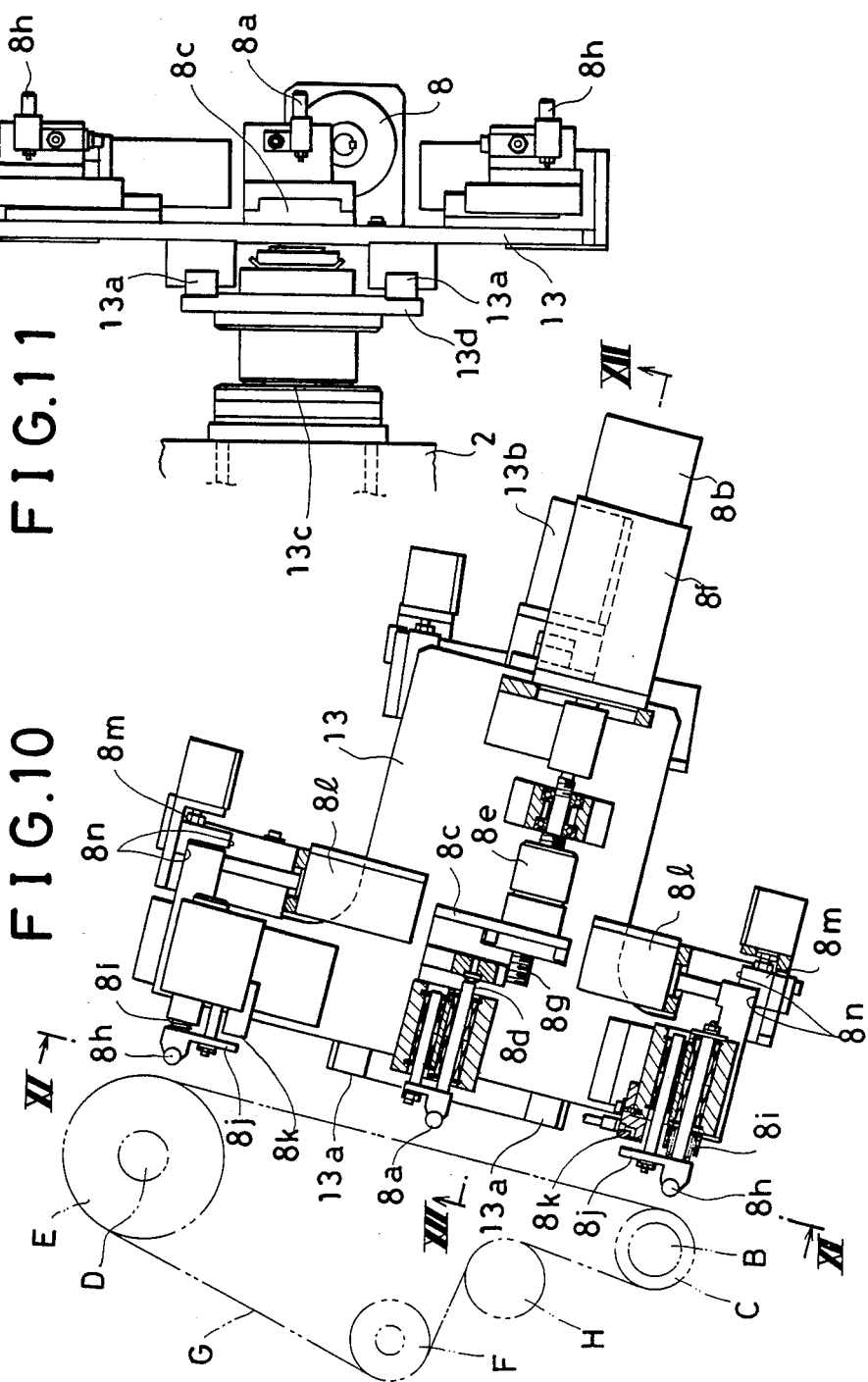

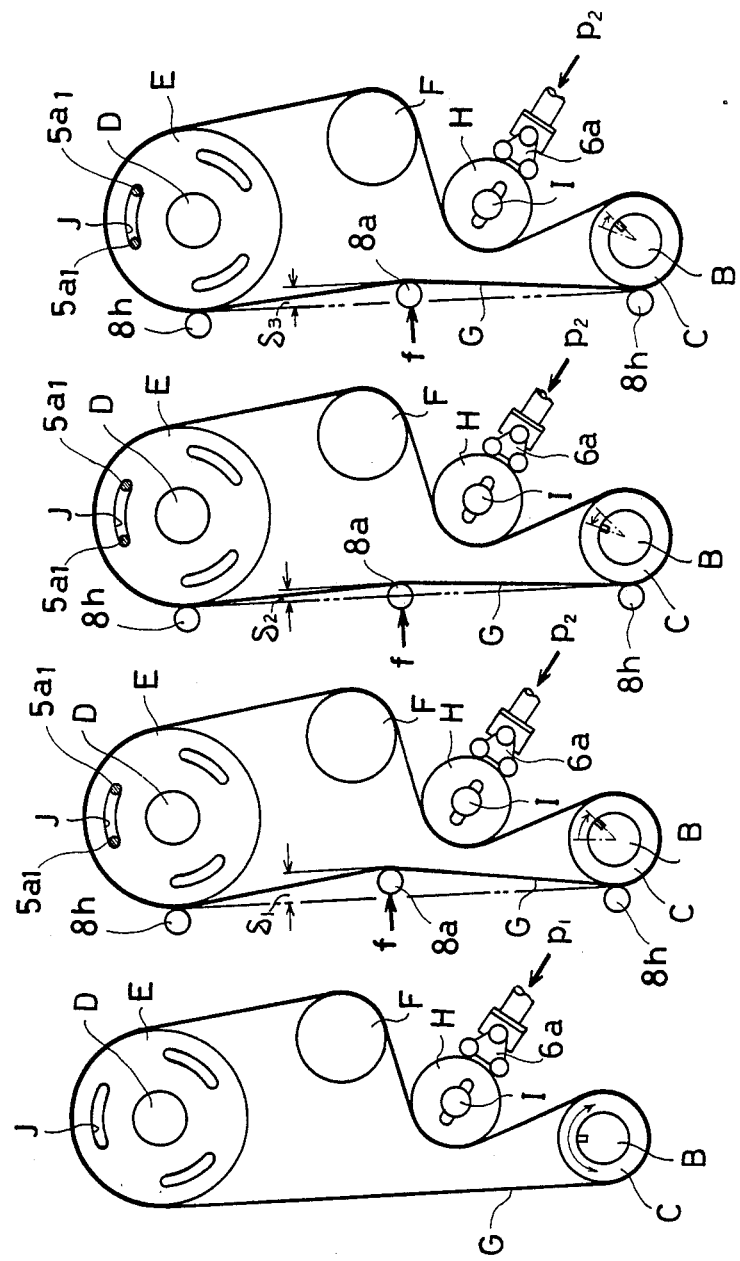

METHOD OF AND APPARATUS FOR ADJUSTING TENSION OF TIMING BELT

BACKGROUND OF THE INVENTION

1. Field of the Invention

The present invention relates to a method of and an apparatus for adjusting the tension of a timing belt chiefly used for an engine for vehicles.

2. Description of the Prior Art

Hitherto, a method has been publicly known, as disclosed in Kokai (Laid-Open) publication No. 60-164607 of Japanese Patent Application for adjusting the tension of a timing belt in an engine. The engine has an engine body, a crankshaft, a driving pulley on the crankshaft, a driven pulley on a camshaft of a valve operating mechanism, an auxiliary pulley for a water pump unit, an oil pump unit, etc., a timing belt bridged over these pulleys, and a tension pulley for pressing a loose side portion of the timing belt from outside. The tension pulley is pressed to be advanced while a predetermined torque is being applied to the driving pulley in its normal rotation direction at the same time that the driven pulley is fixedly held. The tension pulley is then fixed at the advanced position thereof.

The auxiliary pulley is generally disposed between the driven pulley and the driving pulley on the loose side of the timing belt. Since the auxiliary pulley has internal frictional resistance, a partial looseness of the timing belt between the auxiliary pulley and the driven pulley cannot be completely removed simply by such pressing and advancing the tension pulley as carried out by the foregoing conventional method. Even if the predetermined torque is applied to the driving pulley, a tension force acting on the tension side portion of the timing belt is not constant due to ununiform varied frictional forces of the crankshaft. Consequently, the tension of the timing belt cannot be accurately adjusted to obtain a desired tensioned condition.

SUMMARY OF THE INVENTION

It is an object of the present invention to provide a method of and an apparatus for adjusting the tension of a timing belt to solve the foregoing problem.

A first feature of the present invention is to provide a method of adjusting the tension of a timing belt in an engine of the type that there is provided on one side of an engine body a driving pulley on a crankshaft, a driven pulley on a camshaft of a valve operating mechanism, an auxiliary pulley, a timing belt bridged over the driving pulley, the driven pulley, and the auxiliary pulley, and a tension pulley for pressing a loose side portion of the timing belt from outside, characterized by carrying out in order a reverse rotation process in which the driving pulley is rotated in a reverse rotational direction relative to its normal rotational direction when the engine is running so that the loose side portion of the timing belt may be tensioned at its region extending between the auxiliary pulley and the driven pulley, under the condition that the driven pulley is fixedly held in position; a normal rotation process in which the driving pulley is rotated in a normal rotational direction so that a tension side portion of the timing belt may be brought into an overtensioned condition, while the tension pulley is being pushed and advanced toward the timing belt; a fixing process in which the tension pulley is retracted while the driving pulley is being rotated in the reverse direction so that deflection of the tension side portion of the timing belt may reach a predetermined target adjustment value, and thereafter the tension pulley is fixed at a retracted position.

A second feature of the present invention is to provide an apparatus for carrying out the above method of the present invention.

The apparatus of the present invention is characterized in that a jig table movable toward and away from the engine body in an axial direction of the crankshaft is provided with a driving means for driving the driving pulley to rotate, a fixing means for fixing the driven pulley, a pressing means comprising a presser for contacting the tension pulley so as to press it against the timing belt and a driving source for moving the presser back and forth, a tightening means for tightening and loosening a fixing bolt which fastens the tension pulley, and a tension measuring means comprising a presser engageable under a predetermined pressure force with a substantially central portion of a tension side portion of the timing belt and a detector for detecting displacement of the presser.

The foregoing present inventive apparatus is operated as follows:

By the reverse rotation process, the looseness of the timing belt between the driven pulley and the auxiliary pulley is drawn to be collected toward a disposed position of the tension pulley between the auxiliary pulley and the driving pulley.

Next, by the normal rotation process, the tension side portion of the timing belt is brought into an overtension condition, so that the looseness of the tension side portion of the timing belt is drawn to the disposed position of the tension pulley. After all of this, thus, all of the slack extending throughout the entire circumference of the timing belt is collected at the disposed position of the tension pulley, and by advancing of the timing pulley against the timing belt, all of the slack of the timing belt can be removed completely.

By the fixing process, then, the driving pulley is rotated in the reverse direction, while the tension pulley is being retracted, so that the deflection of the tension side portion of the timing belt may reach a target adjusting value. As a result, a desired tension condition of the timing belt can be operated accurately without leaving any looseness between the auxiliary pulley and the driven pulley and without being influenced by variable internal frictional resistances of the crankshaft.

The above and other objects, features and advantages of the present invention will become more clear from the following description with reference to the accompanying drawings in which a preferred embodiment of the present invention is shown by way of illustrative example.

BRIEF DESCRIPTION OF THE DRAWINGS

FIG. 8 is a front view, partly omitted, of a pressing means;

FIG. 9 is a plan view of the pressing means;

FIG. 10 is a front elevational view, partly omitted, of a tension measuring means;

FIG. 11 is a side view viewed in the arrow direction of the line XI—XI in FIG. 10;

FIGS. 17(a), 17(b), 17(c) and 17(d) are diagrams for processes of breaking-in, reverse rotation, normal rotation, and fixing.

DESCRIPTION OF THE PREFERRED EMBODIMENT

Figure 1:
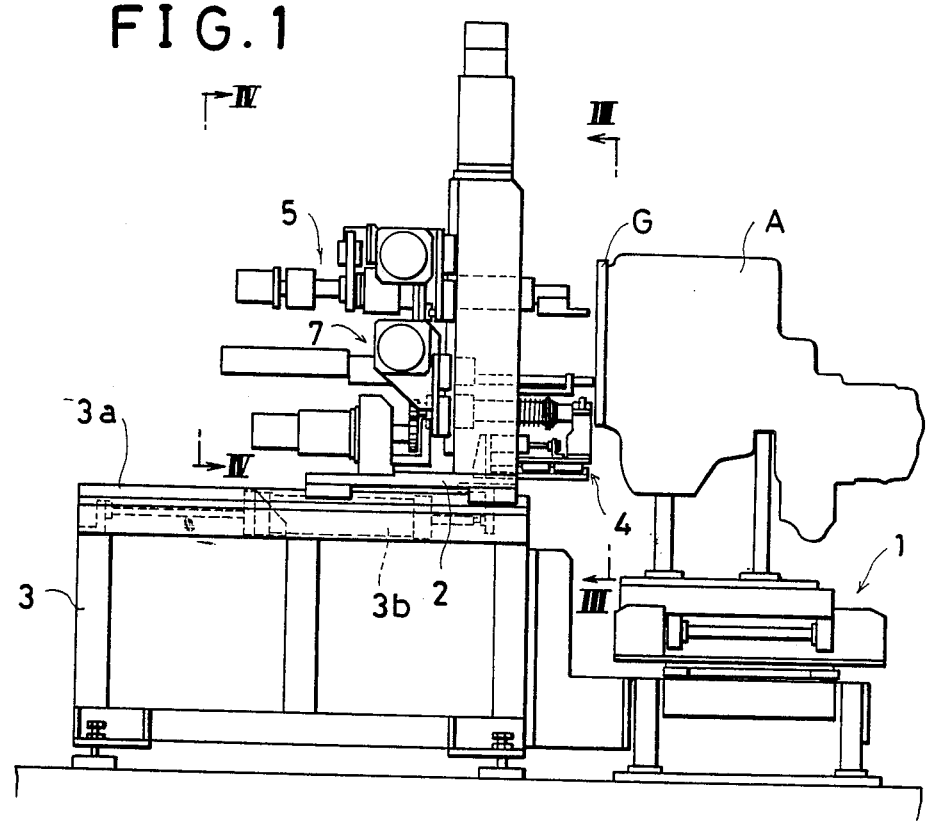
FIG. 1 is a side view of a tension adjusting apparatus used for the method of the present invention.
Figure 2:
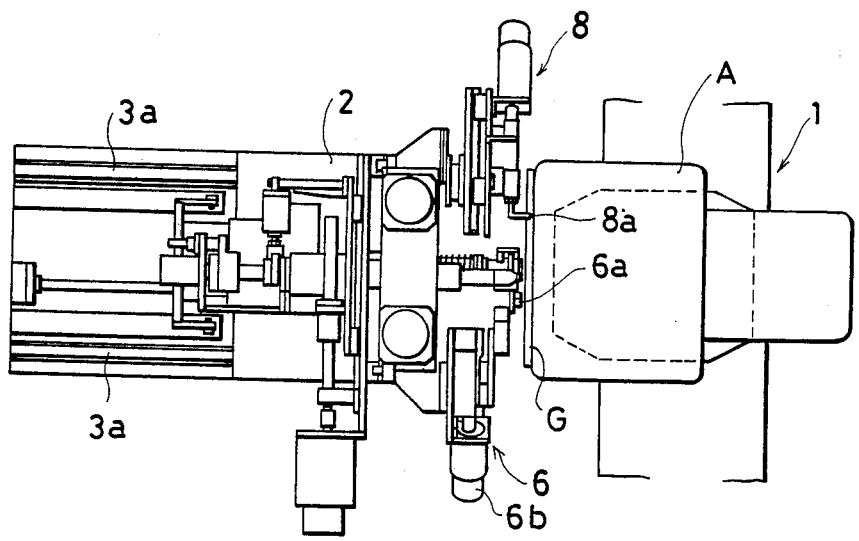
FIG. 2 is a plan view thereof.
Figure 3:
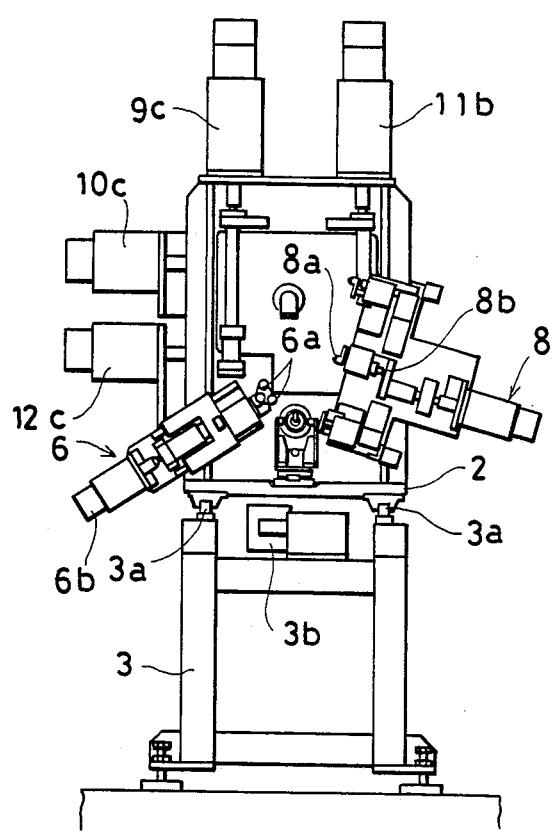
FIG. 3 is an elevational view viewed in the arrow direction of the line III—III in FIG. 1.

FIGS. 1 through 3 show a tension adjusting apparatus for adjusting the tension of a timing belt in an OHC straight-type multicylinder engine, in which there is provided on one side of an engine body A, as clearly shown in FIGS. 17(a) through 17(d), a driving pulley C mounted on a crankshaft B located below, a driven pulley E mounted on a camshaft D of a valve operating mechanism located above, an auxiliary pulley F for a water pump unit, an oil pump unit etc., a timing belt G bridged around these pulleys C, E, F, and a tension pulley H for pressing a loose side portion of a timing belt G from outside.

Referring to FIGS. 1 through 3, numeral 1 denotes a conveyor 1 for conveying the engine body A to a tension adjusting station, and numeral 2 denotes a jig table positioned on one lateral side of the conveyor 1. The jig table 2 is movably provided on rails 3a mounted on an upper surface of a machine frame 3. By a cylinder 3b mounted on the frame 3, the jig table 2 is arranged to be moved axially toward and away from the crankshaft B of the engine body A that has been conveyed to the tension adjusting station. The jig table 2 is provided with a driving means 4 for driving the driving pulley C to rotate, a fixing means 5 for fixedly holding the driven pulley E, a pressing means 6 comprising a presser 6a for pressing the tension pulley H and causing it to press against the timing belt G and a driving source 6b for moving the presser 6a toward and the tension pulley H and in the diametrical direction thereof, a tightening means 7 for tightening and loosening a bolt I in relation to the tension pulley H, and a tension measuring means 8 comprising a presser 8a pressable against a substantially central portion of a tension side portion of the timing belt G under a predetermined pressure and a detector 8b for detecting the displacement of the presser 8a.

Figure 6:
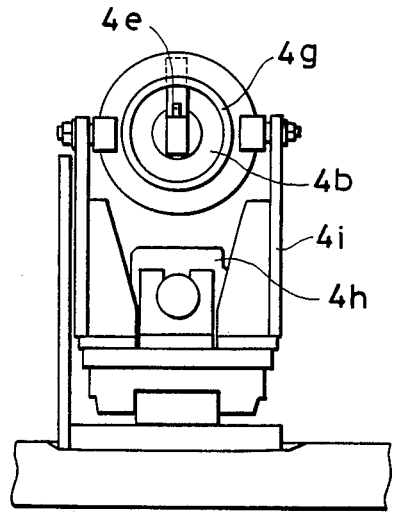
FIG. 6 is a front view of a socket of a driving means.
Figure 4:
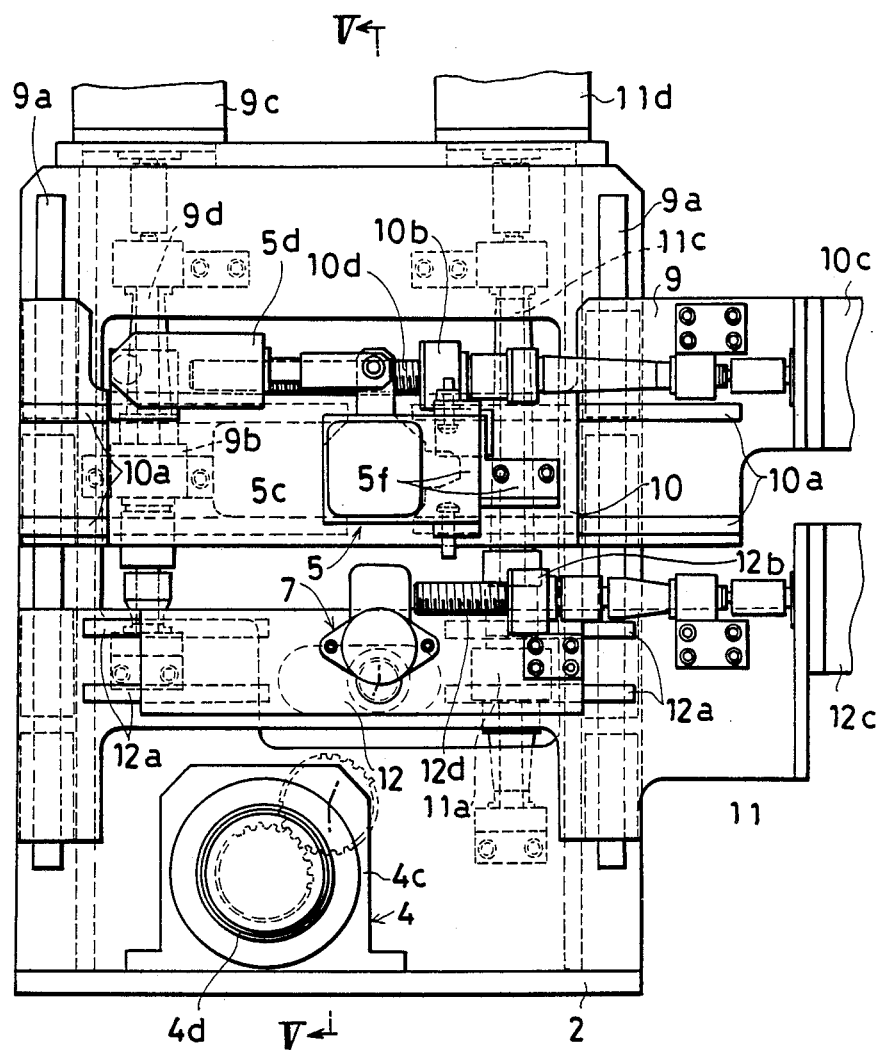
FIG. 4 is an enlarged rear view viewed in the arrow direction of the line IV—IV in FIG 1.
Figure 5:
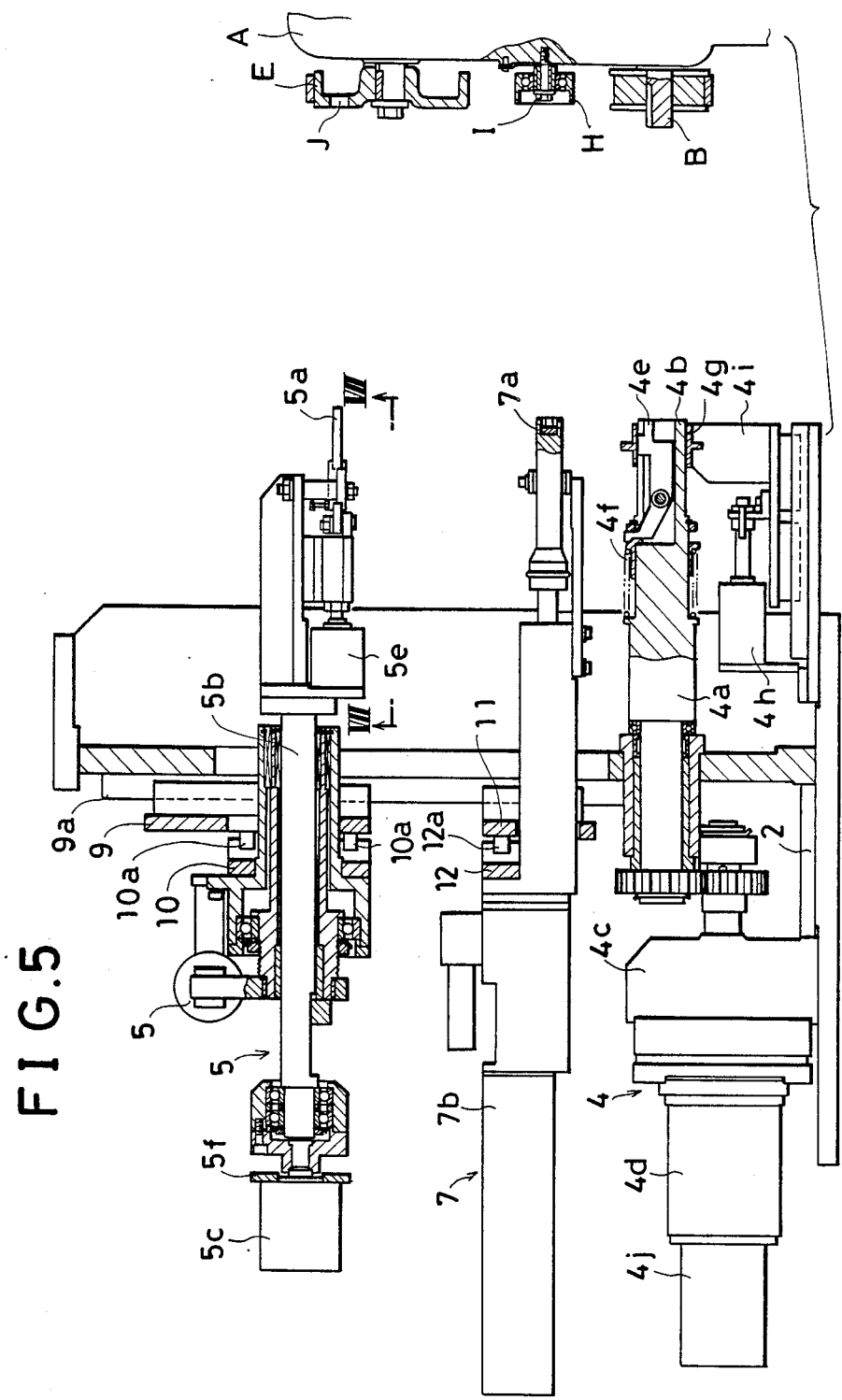
FIG. 5 is a cross-sectional view taken along the line V—V in FIG. 4.
Figure 12:
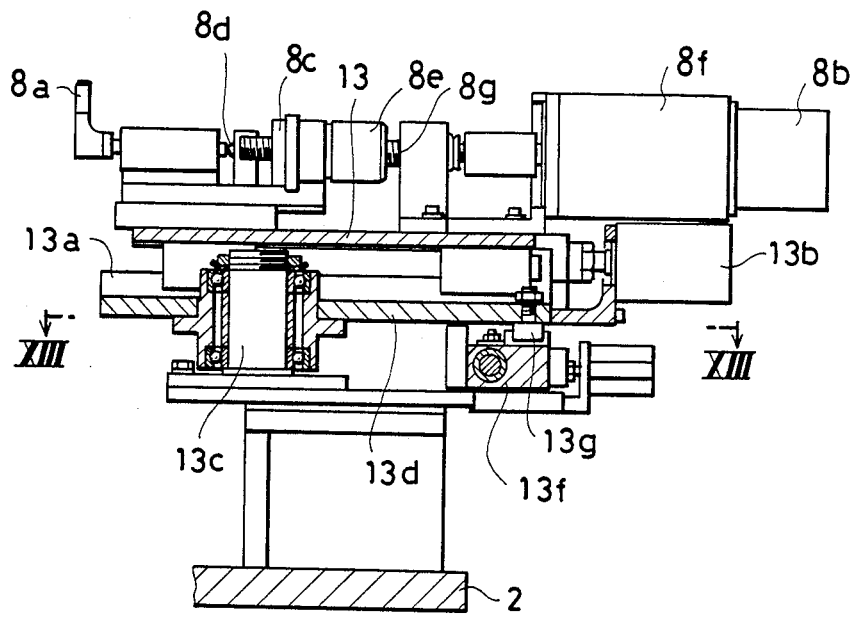
FIG. 12 is a sectional view taken along the line XII—XII in FIG. 10.
Figure 13:
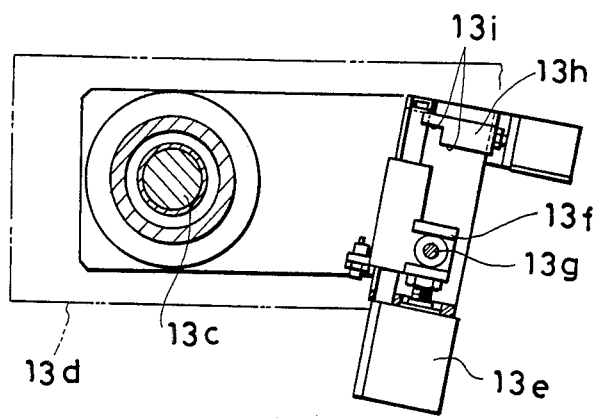
FIG. 13 is a sectional view taken along the line XIII—XIII in FIG. 12.

More in detail, as shown in FIGS. 4 through 6, the driving means 4 comprises a driving shaft 4a rotatably mounted on the jig table 2 and having a socket 4b provided at a forward end portion thereof for receiving an end portion of the crankshaft B, and a motor 4d connected to the driving shaft 4a through a speed reducer 4c mounted on the jig table 2. The socket 4b is provided with a key 4e which is radially swingable about a central pivot and is insertable into a keyway made in the end portion of the crankshaft B. In addition, the key 4e is urged radially inwardly into the socket 4b by a spring 4f so that by movement of the jig table 2 toward the engine A, the socket 4b, while being rotated may be mounted on the end portion of the crankshaft B and the key 4e may be fitted into the keyway in the end portion of the crankshaft B.

A lock sleeve 4g for holding the key 4e from outside is provided around the socket 4b in order to keep the key 4e in the fitted condition in the keyway of the crankshaft B. Thus, the lock sleeve 4g is arranged to be slidable between a locking position on the forward end portion of the driving shaft 4a and an unlocking position on the rear end portion thereof through a fork 4i by a cylinder 4h. A rotation angle of the motor 4d is detected by a detector 4j mounted on the motor 4d.

Figure 7:
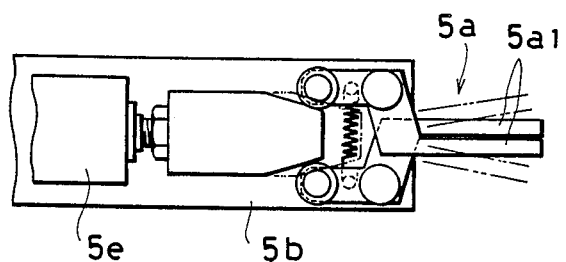
FIG. 7 is an enlarged view of a locking device of a fixing means viewed in the arrow direction of the line VII—VII in FIG. 5.

As shown in FIGS. 4, 5 and 7, the fixing means 5 is composed of a slide bar 5b having on its forward end a locking member 5a for inserting into a hole J made in the driven pulley E, and a cylinder 5c for moving the slide bar 5 toward and away from the driven pulley E. The jig table 2 supports thereon a pair of vertical rails 9a along on which a first slider 9 is movable. A second slider 10 is movable along a pair of horizontal rails 10a mounted on the first slider 9. The cylinder 5c is attached to the second slider 10 by means of a stay 5f. A threaded rod 9d which is rotatable in normal and reverse directions by a first motor 9c threadedly extends through a nut sleeve 9b fixed to the first slider 9. A nut sleeve 10b is fixed to the second slider 10, and a threaded rod 10d rotatable in normal and reverse directions by a second motor 10c threadedly extends through the nut sleeve 10b. The fixing means 5 is attached to the second slider 10. The locking member 5a is offset with respect to the axial line of the slide bar 5b which is arranged to be rotatable by a cylinder 5d mounted on the second slider 10. Thus, the locking member 5a can be moved vertically and horizontally by the first and second sliders 9, 10 by respective operations of the first and second motors 9c, 10c, and can further be turned by operation of the cylinder 5d, so that the fixing means 5 can meet any of various types of engines A.

As shown in FIG. 7, the locking member 5a comprising a pair of locking fingers $5a_1$, $5a_1$ pivotally mounted end of the slide bar 5b and movable toward and away from each other to open and close by a cylinder 5e mounted on a rear portion of the slide bar 5b remote from the locking fingers $5a_1$, $5a_1$. The hole J of the driven pulley E is of circumferentially elongated arcuate shape as shown in FIGS. 17(a) through 17(d), and the locking fingers $5a_1$, 5a which are in their closed condition are inserted into the hole J, so that the hole J and the locking fingers $5a_1$, $5a_1$ are not required to be accurately positioned relatively to each other prior to inserting of the locking fingers $5a_1$, $5a_1$ into the hole J. After the locking fingers $5a_1$, $5a_1$ are inserted into the hole J, they are opened away from each other into engagement with the opposite ends of the hole J, so that the locking fingers $5a_1$, $5a_1$ are firmly held in the hole J without wobbling movement. In addition, since the locking fingers $5a_1$, $5a_1$ are movable to open and close, they can be inserted into desired holes J of different sizes.

As illustrated in FIGS. 4 and 5, the tightening means 7 comprises a nut runner 7b having a socket 7a on its forward end for receiving the head of the bolt I of the tension pulley H. A third slider 11 is movable along on the vertical rails 9a and a fourth slider 12 is movable along a horizontal rails 12a mounted on the third slider 11. A nut sleeve 11a is fixed to the third slider 11, and threaded rod 11c which is rotatable in normal and reverse directions by a third motor 11b is threadedly extended through the nut sleeve 11a. A nut sleeve 12b is fixed to the fourth slider 12, and a threaded rod 12d rotatable in normal and reverse directions by a fourth motor 12c threadedly extends through the nut sleeve 12b so that the tightening means 7 can be moved vertically and horizontally by the third and fourth sliders 11, 12 by respective operations of the third and fourth motors 11b, 12c and may be adaptable for any of various types of engines A.

As shown in FIGS. 8 and 9, the pressing means 6 is composed of a presser 6a comprising a pair of rollers for engaging the peripheral surface of the tension pulley H, and a servomotor 6b constituting a driving source for moving the presser 6a back and forth. A slider 6d which is slidably mounted on a rail 6c is mounted on the jig table 2. The presser 6a is attached to a forward end of the slider 6d through a load cell 6e. A threaded rod 6g which is rotatably in normal and reverse directions by the servomotor 6b, threadedly extends through a nut sleeve 6f fixed to the slider 6d so that the presser 6a may be movable back and forth through the slider 6d in response to operation of the servomotor 6b, and an abutment force of the presser 6a with the tension pulley H may be detected by the load cell 6e.

Proximity switches 6h, 6h shown in FIG. 8 serve to prevent the presser 6a from overrunning. A proximity switch 6i serves to stop the presser 6a at its starting position. A detector 6j detects a rotation angle of the servomotor 6b.

As shown in FIGS. 10 through 13, the tension measuring means 8 comprising the presser 8a and the detector 8b which are mounted on an attachment plate 13 which is movable laterally right and left along on a pair of rails 13a on the jig table 2 by operation of a cylinder 13b. The presser 8a constitutes a roller which is engageable, under a predetermined pressure, with a substantially middle portion of the tension side portion of the timing belt G, and the detector is used for detecting a displacement of the presser 8a. More specifically, the presser 8a is attached to a slider 8c on the attachment plate 13 through a load cell 8d. A threaded rod 8g which is rotatable in normal and reverse directions by means of a servomotor 8f threadedly extends through a nut sleeve 8e fixed to the slider 8c so that the presser 8a may be given forward and backward movements through the slider 8c by operation of the servomotor 8f. The detector 8b serves as a rotary detector for detecting a rotation angle of the servomotor 8f. A pair of touch rollers 8h are mounted on the attachment plate 13 to be engageable with respective peripheral surfaces of the driving and driven pulleys C, E, and be retractable from the pulleys C, E against the forces of respective springs 8i. Thus, as the attachment plate 13 is advanced toward the timing belt G by operation of the cylinder 13b, the touch rollers 8h are brought into abutment with the respective pulleys C, E, and the subsequent advance movement of the attachment plate 13 causes holders 8j of the touch rollers 8h to be seated on seats 8k on the attachment plate 13. Such engagement of the holders 8j with the seats 8k is detected by an air-type detector (not shown), whereupon the advancing movement of the attachment plate 13 is stopped. At that time, the presser 8a touches the timing belt G. It is arranged that an original position of the presser 8a is so set that the presser 8a touches the timing belt G at the time of stop of the advance movement of the plate 13.

In the illustrated example, the rails 13a which support the attachment plate 13 are attached to a guide plate 13d rotatably mounted on a shaft 13c projecting from the jig table 2. A fork member 13f which is movable upwards and downwards by a cylinder 13e is provided on the jig table 2. A projection 13g mounted on one side of the guide plate 13d engages the fork member 13f so that by operation of the cylinder 13e, the guide plate 13d, and accordingly, the attachment plate 13 may be so swung about the shaft 13c that end surfaces of the guide plate 13d or the attachment plate 13 may be made parallel to lines tangential to both the driving and driven pulleys C, E. In addition, the touch rollers 8h are vertically adjustable with respect the attachment plate 13 by means of respective cylinders 8, so that the tension measuring means 8 may be adaptable for various types of engines A.

The vertical movement of the touch rollers 8h is restrained by movable stoppers 8m having stepped surfaces 8n. The vertical movement of the fork member 13f is restrained by a movable stopper 13h having stepped surfaces 13i.

Figure 14:
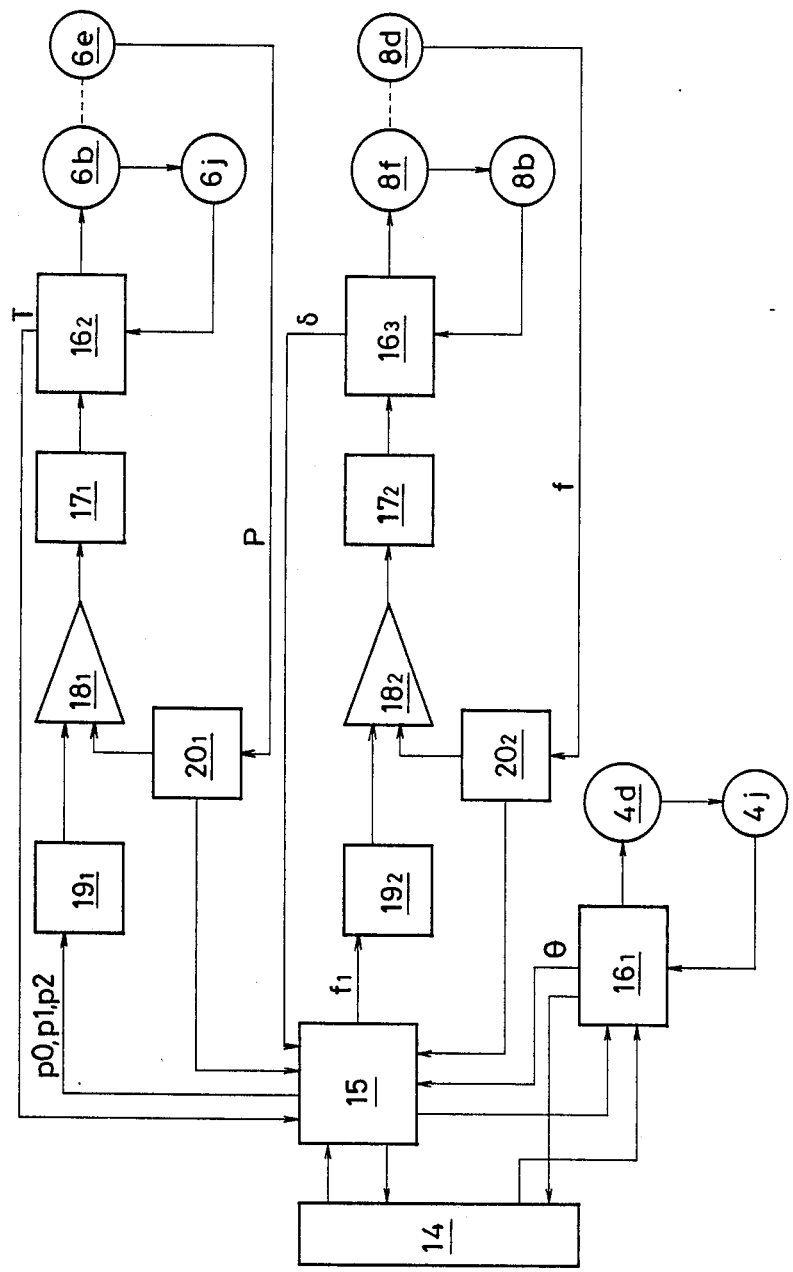
FIG. 14 is a block diagram of a control circuit for the tension adjusting apparatus.

FIG. 14 shows a control circuit for the tension measuring means 8. The control circuit includes a sequencer 14, a microcomputer 15, a servo circuit 16₁ for driving the motor 4d of the driving means 4, a servo circuit 16₂ for driving the motor 6b of the pressing means 6, and a servo circuit 16₃ for driving the motor 8f f of the tension measuring means 8. The motor 4d is given quick rotations or turnings by predetermined rotation angles $\theta_1$, $\theta_2$, $\theta_3$ in response to a signal from the sequencer 14, and is also given stepwise rotations or turnings in response to signals from the microcomputer 15. The motor 6b is feedback-controlled so that a detected value of the pressure p by the load cell 6e coincides with a set value of the pressure p of the tension pulley H against the timing belt G outputted from the microcomputer 15. The motor 8f is feedback-controlled so that a detected value of the pressure f by the load cell 8d coincides with a set value for the pressure f of the presser 8a against the timing belt outputted from the microcomputer 15. More specifically, input sides of the servo circuits 16₂, 16₃ are connected to comparators 18₁, 18₂, respectively, through voltage-to-frequency converters 17₁, 17₂. The comparators 18₁, 18₂ are supplied with set signals of the pressures p, f from microcomputer 15 through respective digital-to-analog converters 19₂, 19₂ and, at the same time with detected signals of the pressures p, f from the load cells 6e, 8d, respectively, through amplifiers 20₁, 20₂, so that in response to deviation signals from the respective comparators 18₁, 18₁, the motors 6b, 8f are controlled through the servo circuits 16₂, 16₃ to rotate in normal and reverse directions so that the detected values of the pressures p, f may be made equal to the set values.

In addition, it is arranged that a rotation angle $\theta$ of the driving pulley C detected by the detector 4j resulting from rotation of the motor 4d, a position T of the tension pulley H detected by the detectors 6j resulting from rotation of the motor 6b, and a deflection $\delta$ of the timing belt G detected by the detector 8b resulting from rotation of the motor 8f, may be inputted to the microcomputer 15 from the respective servo circuits 16₁, 16₂, 16₃.

Figure 15:
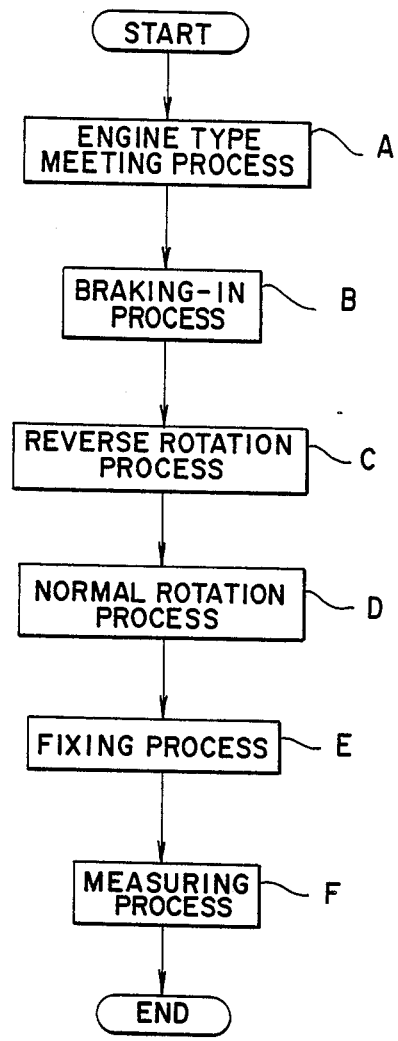
FIG. 15 is a flow chart of an overall procedural sequence for tension adjustment.

The entire procedural sequence of a tension adjustment work is shown in FIG. 15. First, the tension adjusting apparatus is so adjusted so to meet the type of an engine A (an engine type meeting process (A)). Next, under the condition that the tension pulley H is pressed to be advanced, the driving pulley C is rotated in normal and reverse directions by a predetermined angle as shown in FIG. 17(a) (a breaking-in process Thereafter, under the condition that the driven pulley E is fixed in position, the driving pulley C is rotated in the reverse direction as shown in FIG. 17(b) in order to tension a loose side portion of the timing belt G between the auxiliary pulley F and the driven pulley E (a reverse rotation process (C)). Thereafter, while the tension pulley H is being pressed to be advanced, the driving pulley C is rotated in the normal direction as shown in FIG. 17(c) so that a tensioned side portion of the timing belt G may become overtensioned (a normal rotation process (D) ). Thereafter, while the driving pulley C is being rotated in the reverse direction as shown in FIG. 17(d) so that the deflection δ of the tensioned side portion of the timing belt G may become a predetermined target adjustment value, the tension pulley H is retracted and is fixed at the retracted position (a fixing process (E)). After fixing of the tension pulley H to the retracted position, the flexing amount δ of the timing belt G is measured again (a measuring process (F)). Thus, the tension adjusting apparatus is returned to its original position.

Figure 16A:
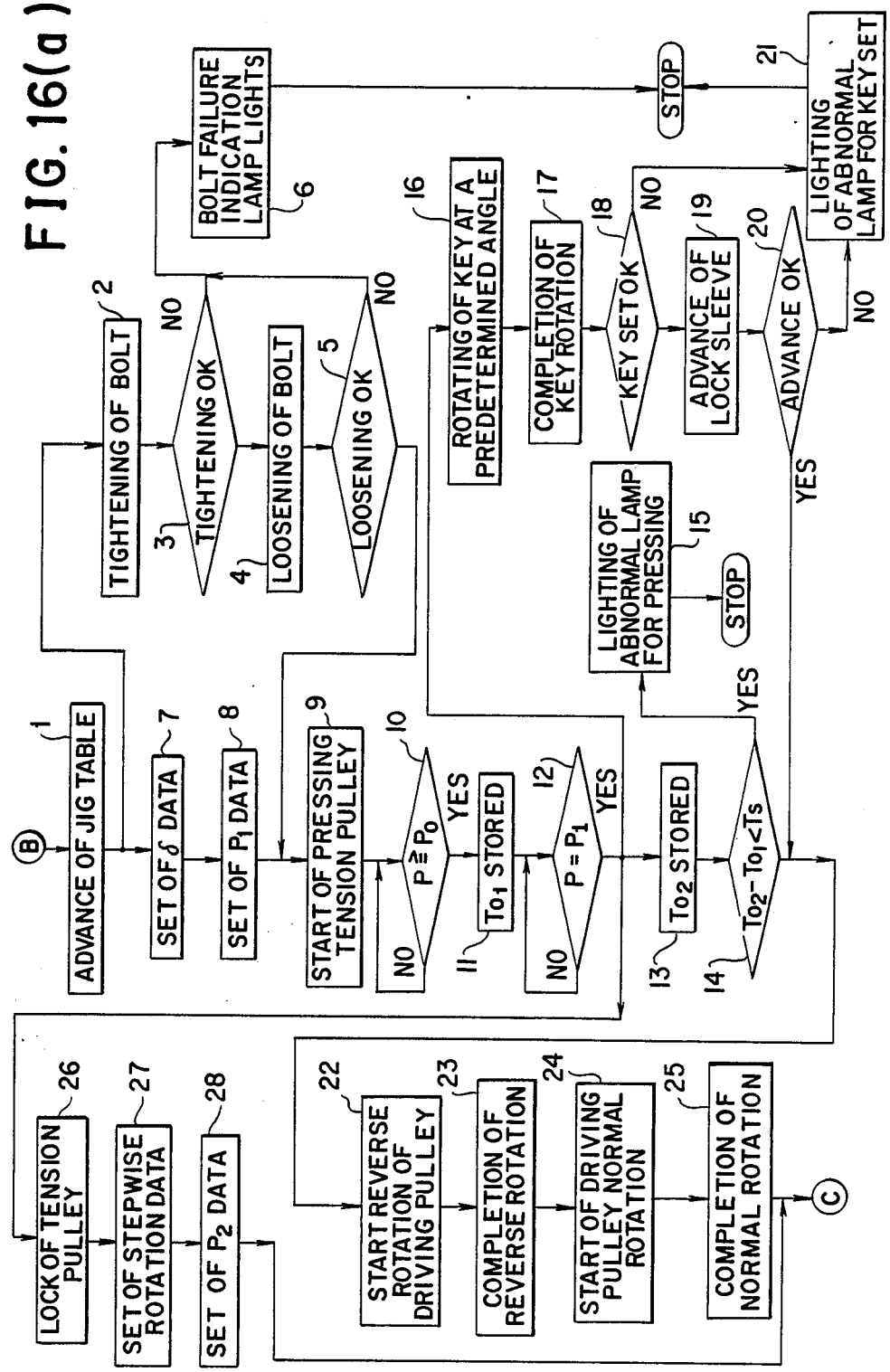
FIGS. 16(a), 16(b), 16(c), 16(d), and 16(e) are flow charts of breaking-in, reverse rotation, normal rotation fixing, and measuring processes, respectively.

The processes (B) through (F) will be described in greater detail as follows:

The operation sequence of the breaking-in process B is illustrated in FIG. 16(a). After the engine A is brought to the tension adjusting station by the conveyor I, the cylinder 3b, firstly, is operated and thereby the jig table 2 is advanced toward the engine A ((1)), so that the end of the crankshaft B is inserted into the socket 4b of the driving means 4 and also the head of the bolt I of the tension pulley H is inserted into the socket 7a of the tightening means 7. At the same time, the forward end of the socket 7a is brought into contact with the outer side surface of the tension pulley H so as to cause the pulley H to press toward the engine A for correcting the posture of the pulley H. Then, the nut runner 7b is operated to tighten the bolt I until the tightening torque reaches a predetermined value ((2) (3)), and then the bolt I is loosened by a predetermined angle ((4) and (5)). As a result, the frictional force obtained when the tension pulley H is moved toward the timing belt G becomes constant. In addition, if the tightening torque does not reach a predetermined value even in the lapse of a predetermined period of time due to dropping of the bolt I, improper threaded engagement of the bolt I or damage of the nut runner 7b, or if the bolt I cannot be loosened an abnormal indication lamp for the bolt lights ((6)), and as a result the tension adjusting procedure is stopped.

Simultaneous with tightening and loosening of the tightening bolt I, deflection data stored in the microcomputer 15 is reset to zero ((7)), and also a set value p₁ (e.g., 110 kg) of the pressure p in the breaking-in process is set ((8)). After loosening of the bolt I is completed, the presser 6a of the pressing means 6 is advanced by the motor 6b to cause the tension pulley H to press against the timing belt G ((9)). In the first place, when a position of the tension pulley H at such a point in time that the pressure p has been increased to a very low minimum set value p₀(5–10 kg) by the reactive force to the pressing to the pressure, i.e., a pressing starting position To₁ is stored ( (10) (11) ). Thereafter, a position of the tension pulley H at such a point in time that the pressure p has been increased to P₁ and has become stable at p₁, i.e., a pressing completion position To₂, is stored ( (12) and (13)). Then, the positions To₁ and To₂ are compared ( (14)). When the difference between To₁ and To₂ is smaller than a predetermined allowable value Ts, then an abnormal indication lamp for the pressing lights ( (15)), nd the tension adjusting procedure is stopped.

The occasions that the difference To₂−To₁ becomes smaller than Ts are, for instance, where the tension pulley H becomes immovable due to occurrence in something wrong therewith or where since the timing belt is too long or broken off because the same is for a different type of engine, so that the tension pulley H is pressed to be brought to an endmost advanced position before the pressure p is increased to the value p₀.

After the pressure p is increased to p₁ to become stable at p₁, the driving shaft 4a of the driving means 4 is so rotated by a predetermined angle so that the key 4e may fit into the keyway of the crankshaft B ( (16) and (17) ). Whether the key 4e has been fitted in the keyway or not, in other words, whether the key set thereof has been succeeded or not, is confirmed by a signal from a proper detector for detecting the swing movement of the key 4e ( (18) ). If the key set has been successful that is, the key 4e has been fitted into the keyway, then the lock sleeve 4g is advanced ( (19) ). Whether or not the lock sleeve 4g has been advanced to the locking position is confirmed ( (20) ). If the key 4e is not properly set or the lock sleeve 4g is not advanced properly, an abnormal indication lamp for the key setting lights ( (21) ), and the tension adjusting procedure is stopped. If no such a trouble occurs, then the crankshaft B i.e., the driving pulley C is rotated by the driving means 4 in the normal and reverse direction by a rotation angle (e.g., 360°) which is greater than an angle corresponding to the maximum length of the timing belt G which is bridged extending over the pulleys C, E, F ( (22), (23), (24), and (25)).

The above back-and-forth travel of the timing belt G causes the teeth of the pulleys C, E, F and those of the timing belt G to become well engaged with each other, so that any error in adjustment that would otherwise occur if they are not well engaged with each other can be avoided. When the driving pulley C is rotated in the normal and reverse directions, the tension pulley H is locked at the foregoing completion position To₂ ( (26) ). Simultaneous with rotating of the driving pulley C in the normal and reverse directions, the rotation amount at each step for stepwise rotations of the driving pulley C and a set value p₂ (e.g., 52 kg) of the pressure p in the reverse rotation process (C), the normal rotation process (D), and the fixing process (E), as described below, are set ( (27) and (28) ). Thereafter, the subsequent reverse rotation process is carried out.

Figure 16B:
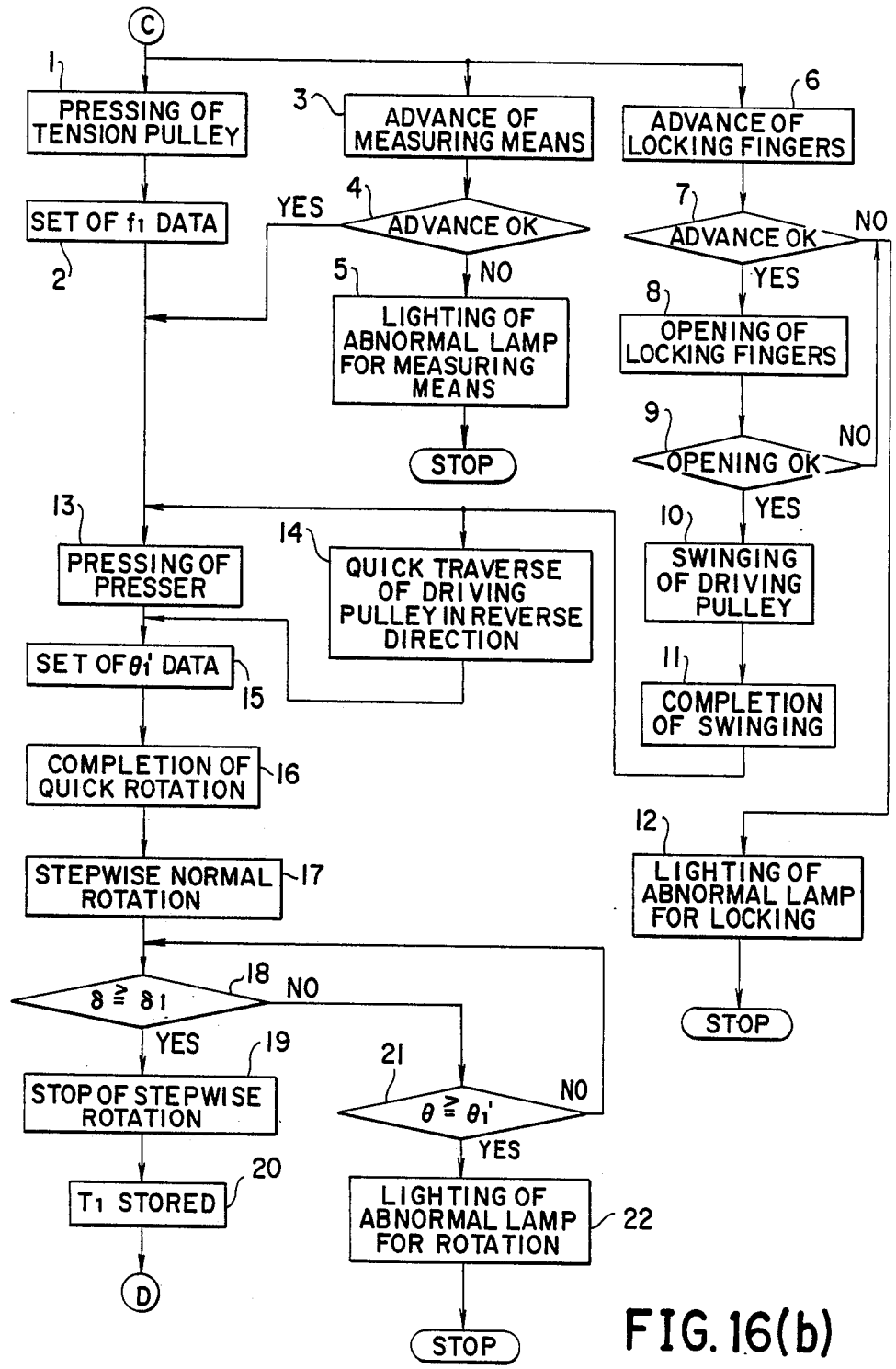

The reverse rotation process (C) is shown in FIG. 16(b). First, the tension pulley H is pressed by the pressing means 6 so that the pressure p is maintained at p₂ ((1)), and also a set value f₁ (e.g., 2 kg) for the pulley F is se At the same time, the tension measuring means 8 is advanced towards the belt G by the movement of the attachment plate 13 caused by the cylinder 13b ((3)). Then, whether the tension measuring means 8 has reached an endmost advanced position at which the holders 8j of the touch rollers 8h are seated on the respective seats 8k ((④)) is checked. If the tension measuring means 8 has not reached the endmost advance position even in the lapse of a given amount of (e.g., 3 seconds), then an abnormal indication lamp for the measuring means lights ((⑤)), and the tension adjusting procedure is stopped. Simultaneously with the advancing movement of the tension measuring means 8, the locking fingers $5a_1$ of the fixing means 5 are moved by the cylinder 5c to an endmost advanced position at which they are inserted in the hole J of the driven pulley E ((⑥) and (⑦)). Thereafter, the locking fingers $5a_1$ are spread apart by the cylinder 5e ((⑨) and (⑩)). At that time, it sometimes happen that the locking fingers $5a_1$ stick to inner wall surfaces of the engaging hold J having curvature, resulting in being not fully spread apart. To prevent this, the driving pulley C is rotated in the normal and reverse directions by a small angle by the driving device 4 ((⑩) and (⑪)) to cause the locking fingers $5a_1$ to release any sticking to the inner wall surfaces of the hole J and to engage the opposite ends of the hole J. If the locking fingers $5a_1$ fail to reach the end most advanced position due, for example, to their positional misalignment with the hole J even in the lapse of a certain period of time, or if the locking fingers $5a_1$ remain closed due, for example, to a failure of the cylinder 5e even in the lapse of a certain period of time, then an abnormal indication lamp for the locking fingers ((⑫)) lights and the tension adjusting procedure is stopped.

Thereafter, the presser 8a of the tension measuring means 8 is pressed against the timing belt G so that the pressure f may reach the set value $f_1$ ((⑬)). At the same time, the driving pulley C is quickly rotated in the reverse direction by a predetermined rotation angle $\theta_1$ by the driving means 4. During the quick rotation thereof, a maximum reverse rotation angle $\theta_1'$ for the driving pulley C is set ((⑮)). After completion of the quick rotation ((⑯)), driving pulley C is rotated in stepwise fashion further in the reverse direction until the deflection amount $\delta$ of the timing belt G which is detected from the displacement of the presser 8a becomes equal to or greater than a reference value $\delta_1$ (e.g., 15 mm) ((⑰) and (⑱)). When $\delta \geq \delta_1$, the stepwise rotation of the driving pulley C is stopped ((⑲)), and the position $T_1$ of the tension pulley H at that time is stored ((⑳)).

The reverse rotation reference value $\delta_1$ is set to a value corresponding to an amount of deflection of the tensioned side portion of the timing belt G that is experimentally obtained as a result of the total looseness of the looseness of the loose side portion of the timing belt G and the looseness of the timing belt G between the driven pulley E and the auxiliary pulley F having been removed by being drawn to the disposed position of the tension pulley H. Thus, by the reverse rotation process ((Ⓒ)), so that there remains the looseness of the timing belt G at its tensioned side portion alone.

If the reverse rotation angle $\theta$ of the driving pulley C exceeds $\theta_1$, before there is obtained $\delta \geq \delta_1$ due to disorder of the apparatus such as damage of the locking fingers $5a_1$ or the like then an abnormal indication lamp lights ((㉑) and (㉒)), and the tension adjusting procedure is stopped.

Figure 16C:
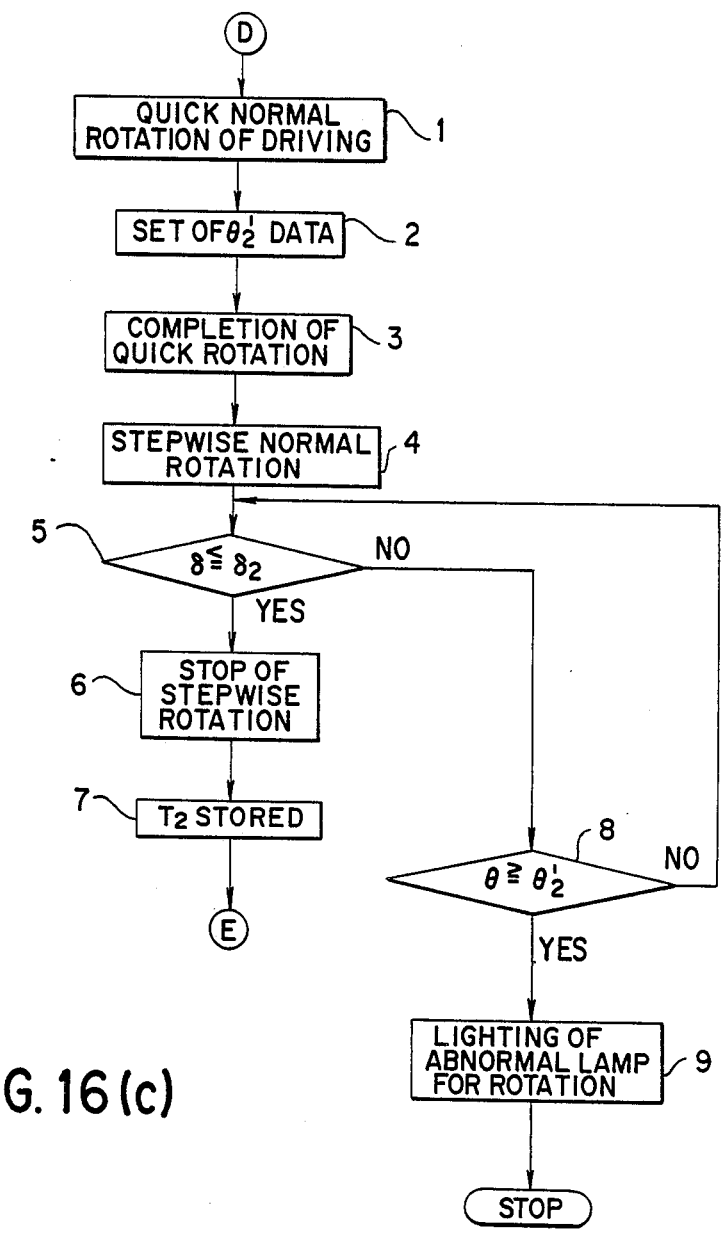

FIG. 16(c) shows a flow chart of the normal rotation process (Ⓓ).

In the first place, the driving pulley C is quickly rotated in the normal direction by at a rotation angle $\theta_2$ by the driving means 4 ((①)). During this quick normal rotating thereof, a maximum rotation angle $\theta_2'$ of the normal rotation of the driving pulley C is set ((②)). After completion of the quick rotation of the driving pulley C ((③)), the driving pulley C is rotated stepwise further in the normal direction so that the deflection $\delta$ of the timing belt G may become smaller than a normal rotation reference value $\delta_2$ (e.g., 3 mm) ((④) and (⑤)). Where there is obtained $\delta \geq \delta_2$, the stepwise rotation of the driving pulley C is stopped ((⑥)), and the position $T_2$ of the tension pulley H at that time is stored ((⑦)).

In this case, the normal rotation reference value $\delta_2$ is set to be smaller than a target adjustment value $\delta_3$ (e.g., 8.5 mm) as described hereinafter. Thus, by the normal rotation process, the tension side portion of the timing belt G is brought in an overtensioned condition, and all of the looseness of the timing belt G are collected together between the driving pulley C and the auxiliary pulley F, and the looseness extending over the entire circumference of the timing belt G is completely removed by the tension pulley H which has been advanced so that the condition $p = p_2$ may be obtained.

If the normal rotation angle of the driving pulley C exceeds that $\theta_2'$, before $\delta < \delta_2$ may be obtained, as a result of an abnormal condition of the timing belt G, such as a breaking off the same in the course of the normal rotation of the driving pulley C, then an abnormal indication lamp lights ((⑧) (⑨)), and the tension adjusting procedure is stopped.

Figure 16D:
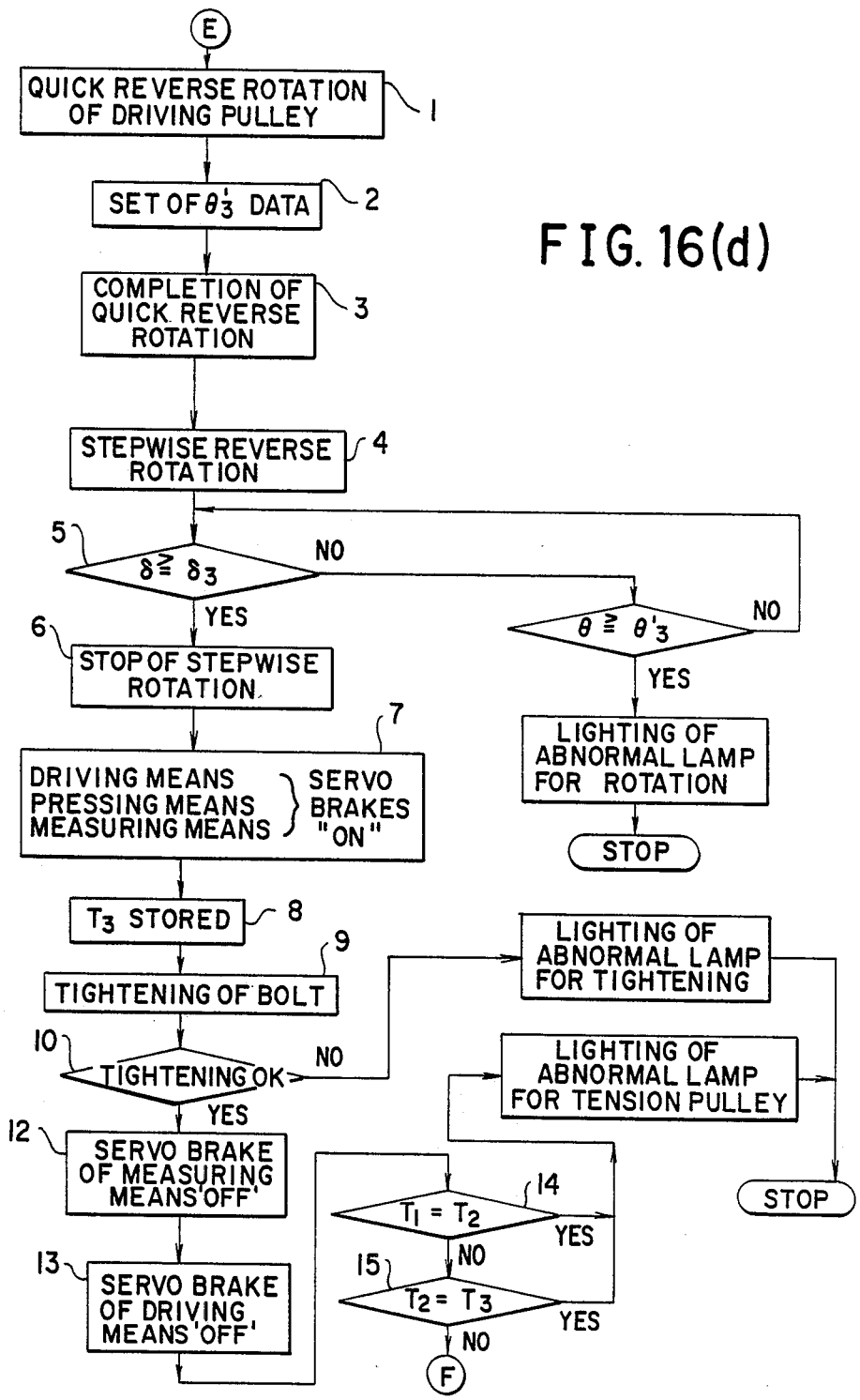

FIG. 16(d) shows a flow chart of the fixing process ((Ⓔ)). Firstly, the driving pulley C is quickly rotated in the reverse direction by a rotation angle $\theta_3$ by the driving device 4 ((①)). During this quick rotation thereof, a maximum angle $\theta_3'$ of the driving pulley C is set ((②)). After completion of the quick rotation of the driving pulley C ((③)), the driving pulley C is rotated stepwise further in the reverse direction so that the deflection $\delta$ of the timing belt G may reach a target adjustment value $\delta_3$ ((④) and (⑤)). At the point in time when there is obtained the condition $\delta \leq \delta_3$, the stepwise rotation of the driving pulley C is stopped ((⑥)). Servo brakes provided in the respective motors 4d, 6b, 8f of the driving means 4, the pressing means 6, and the tension measuring means 8 are made operative ((⑦)), and a position $T_3$ of the tension pulley H obtained at that time stored ((⑧)). Thereafter, the nut runner 7b of the tightening means 7 is operated to tighten the bolt I ((⑨)). If the nut tightening torque does not reach a predetermined torque value due to disorder of the nut runner 7b, etc., even in the lapse of a predetermined period of time, then an abnormal indication lamp for the nut tightening lights ((⑩) and (⑪)), and the tension adjusting procedure is stopped.

If the nut I is properly tightened, then the brake in the motor 8f of the tension measuring means 8 and the brake in the motor 4d of the driving means 7 are made inoperative in order ((⑫) and (⑬)). Thereafter, the position $T_1$ of the tension pulley H at the time of completion of the reverse rotation process and the position $T_2$ of the tension pulley H at the time of completion of the normal rotation process are compared ((⑭); and the position $T_2 2$ and the position $T_3$ are compared ((⑮)). If the tension pulley H is immovable due to a failure thereof for some reason, then there is obtained the result $T_1 = T_2$ or $T_2 32 T_3$. On that occasion an abnormal indication lamp for the tension pulley lights, and consequently the tension adjusting procedure is stopped.

Similarly to the case of the reverse rotation process, when the reverse rotation angle θ of the driving pulley C exceeds $\theta_3$, due to an apparatus failure before obtaining the result $\delta \geq \delta_3$, an abnormal indication lamp for the rotation lights ( (16) and (17) ), and the tension adjusting procedure is stopped.

Figure 16E:
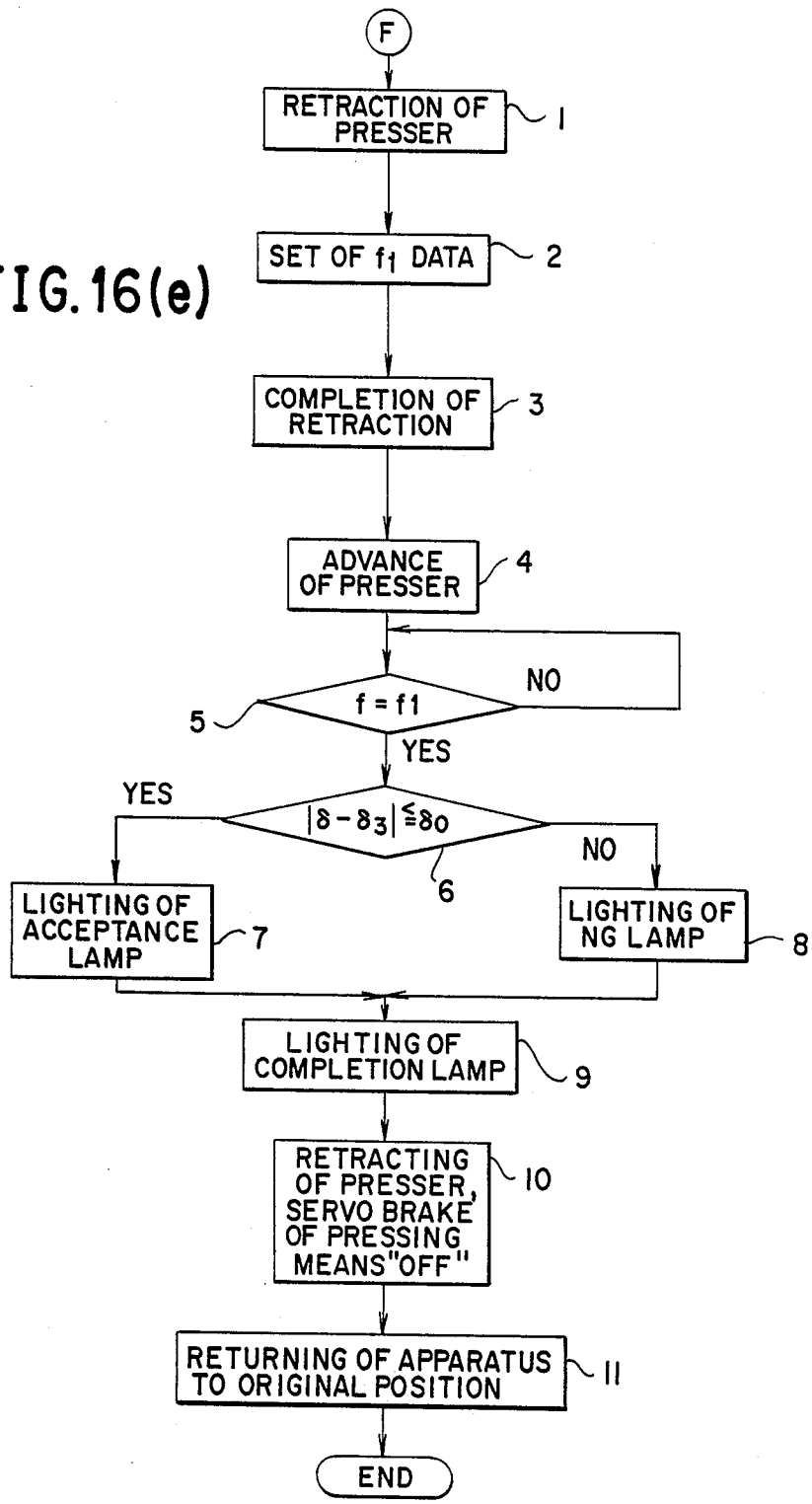

FIG. 16(e) shows a flow chart of the measuring process ((F)). The presser 8a of the tension measuring 8 is once retracted ((1)). While the presser 8a is being retracted, the set value $f_1$ for the pressure f is set again ((2)). After completion of retraction of the presser 8a ((3)), the presser 8a is advanced again ((4)). When the pressure f has become stable at set the value $f_1$((5)), there is carried out an ascertainment as to whether or not the difference between the deflection δ and $\delta_3$ is equal to or smaller than an allowable value $\delta_0$. If the difference is equal to or smaller than the allowable value $\delta_0$, than an acceptance lamp lights ((7)). If the same does not fall below the allowable value $\delta_0$, due, for example, to a positional deviation of the tension pulley H resulted from tightening the bolt I, then an NG lamp lights ((8)). After a completion lamp is then lit ((9)), the presser 8a is retracted and, meanwhile, the brake in the motor 6b the pressing means 6 is made inoperative ((10)). Thereafter, the tension adjusting apparatus is returned to its original position by retracting the presser 6a of the pressing means 6, retracting the attachment plate 13 of the tension measuring means 8, bringing together and retracting the locking fingers $5a_1$ of the fixing means 5, retracting the lock sleeve 4g of the driving means 4 and retracting the jig table 2, ((11)). Thus, the tension adjusting procedure is completed.

In the fixing process of the above embodiment, the driving pulley C is rotated in the reverse direction, while the deflection δ of the tension side portion of the timing belt G is being measured, until the deflection δ reaches the target adjustment value $\delta_3$. However, the belt tension may be adjusted so as to obtain $|\delta - \delta_3| \geq \delta_0$ by such a manner that the driving pulley C is rotated in the reverse direction by a predetermined angle according to experimentally resultant data by using the condition upon completion of the normal rotation process as a reference. At the same time, the tension pulley H is retracted by a predetermined amount according to experimentally resultant data, and the tension pulley H is fixed at its retracted position. In this case, it is preferable that to rotate the driving pulley C in the reverse direction while measuring the deflection as described above, in order to reduce tension adjustment varieties.

According to the present invention, as described above, the total loosenesses extending throughout the entire circumference of timing belt are collected together and removed at the disposed position of the tension pulley between the driving pulley and the auxiliary pulley by the reverse rotation process and normal rotation process. Consequently, the tension of the timing belt can accurately be adjusted by the next fixing process without leaving any looseness between the auxiliary pulley and the driven pulley and without being influenced by the internal frictional force of the crankshaft. In addition, since the timing belt is strongly tensioned by the reverse rotation process and normal rotation process, it results that the tension of the timing belt is adjusted after initial elongation of the timing belt has been completed. Thereby it can be prevented that the timing belt is loosened due to initial elongation thereof during operation of the engine. Further, according to the tension adjusting apparatus of the present invention, it has such advantages that the foregoing processes can be carried out one after another and at a good efficiency and an improvement in workability can be achieved.

Although the preferred embodiment has been shown and described, it should be understood that many changes and modifications may be made therein without departing from the scope of the appended claims.

What is claimed is:

1. A method of adjusting the tension of a timing belt in an engine, the engine having an engine body, a crankshaft in the body, on one side of the engine body a driving pulley on the crankshaft, a driven pulley on a camshaft of a valve operating mechanism, an auxiliary pulley, a timing belt bridged over the driving pulley, the driven pulley, and the auxiliary pulley, and a tension pulley for pressing a loose side portion of the timing belt from outside, characterized by carrying out the following steps in order, reversely rotating the driving pulley in a reverse rotational direction opposite to a normal rotation direction when the engine is running so that loose side portion of the timing belt is tensioned at its region extending between the auxiliary pulley and the driven pulley, under the condition that the driven pulley is fixedly held in position; normally rotating the driving pulley in the normal rotational direction so that a tension side portion of the timing belt is brought into an overtensioned condition, while the tension pulley is being pushed and advanced toward the timing belt; and retracting the tension pulley while the driving pulley is rotated in the reverse direction so that defection of the tension side portion of the timing belt may reach a predetermined target adjustment value, and thereafter fixing the tension pulley at a retracted position.

2. A method claimed in claim 1, wherein, prior to the step of initial reversely rotating of the driving pulley, the driving pulley is rotated in the normal and reverse directions by a predetermined angle under the condition that the tension pulley is pressed to be advanced without fixing the driven pulley.

3. A method claimed in any one of claim 1 or 2, wherein prior to the step of initial reversely rotating of the driving pulley the tension pulley is pressed to be advanced until the pressure force against the timing belt is increased to reach a relatively high predetermined set value, and a position of the tension pulley at such a starting point in time of the pressing that the pressure force starts to increase from zero and a position of the tension pulley at such a completion point in time of the pressing that the pressure force is increased to a predetermined set value are detected, and based on the result as to whether the difference between the positions is smaller than a predetermined allowable value, a discrimination is determined between the existence and nonexistence of an abnormality.

4. A method claimed in claim 3, wherein prior to the step of initial reversely rotating the driving pulley and after a bolt for fixing the tension pulley is once fastened by a predetermined torque, the bolt is unfastened by a predetermined rotation angle.

5. A method claimed in claim 3, wherein in the reverse rotation step, the normal rotation step and the retracting and fixing step, the tension pulley is controlled to be advanced and retracted with respect to said timing belt so that the pressure of the tension pulley against the timing belt may be kept at a predetermined value.

6. A method claimed in claim 5, wherein a retracted position of the tension pulley in the reverse rotation step, an advanced position of the tension pulley in the normal rotation step, and a retracted position of the tension pulley in the retracting and fixing step are detected, and a discrimination between existence and nonexistence of an abnormality is determined based on the ascertainment as to whether those positions are changed or not.

7. A method claimed in claim 4, wherein in the reverse rotation step, the normal rotation step and the retracting and fixing step, the tension pulley is controlled to be advanced and retracted with respect to said timing belt so that the pressure of the tension pulley against the timing belt may be kept at a predetermined value.

8. A method claimed in claim 7, wherein a retracted position of the tension pulley in the reverse rotation step, an advanced position of the tension pulley in the normal rotation step, and a retracted position of the tension pulley in the retracting and fixing step are detected, and a discrimination between existence and nonexistence of an abnormality is determined based on the ascertainment as to whether those positions are changed or not.

9. A method claimed in any one of claims 1 or 2, wherein prior to the step of initial reversely rotating the driving pulley and after a bolt for fixing the tension pulley is once fastened by a predetermined torque, the bolt is unfastened by a predetermined rotation angle.

10. A method claimed in claim 9, wherein in the reverse rotation step, the normal rotation step and the retracting and fixing step, the tension pulley is controlled to be advanced and retracted with respect to said timing belt so that the pressure of the tension pulley against the timing belt may be kept at a predetermined value.

11. A method claimed in claim 10, wherein a retracted position of the tension pulley in the reverse rotation step, an advanced position of the tension pulley in the normal rotation step, and a retracted position of the tension pulley in the retracting and fixing step are detected, and a discrimination between existence and nonexistence of an abnormality is determined based on the ascertainment as to whether those positions are changed or not.

12. A method claimed in any one of claims 1 or 2, wherein in the reverse rotation step, the normal rotation step and the retracting and fixing step, the tension pulley is controlled to be advanced and retracted with respect to said timing belt so that the pressure of the tension pulley against the timing belt may be kept at a predetermined value.

13. A method claimed in claim 12, wherein a retracted position of the tension pulley in the reverse rotation step, an advanced position of the tension pulley in the normal rotation step, and a retracted position of the tension pulley in the retracting and fixing step are detected, and a discrimination between existence and nonexistence of an abnormally is determined based on the ascertainment as to whether those positions are changed or not.

14. A method claimed in claim 1, wherein the driving pulley is rotated while a deflection amount of the tension side portion of the timing belt is being measured in each of the reverse rotation step, the normal rotation step and the retracting and fixing step and the reverse rotation of the driving pulley in the reverse rotation step is stopped when the deflection amount increases to a reference value of reverse rotation which is greater than the target adjustment value, and the normal rotation of the driving pulley in the normal rotation step is stopped when the deflection amount decreases to a reference value of normal rotation which is smaller than the target adjustment value, and the reverse rotation of the driving pulley in the retracting and fixing step is stopped when the deflection amount increases to the target adjustment value.

15. A method claimed in claim 14, wherein in the reverse rotation step, the normal rotation step and the retracting and fixing step, respective maximum angles of normal and reverse rotations of the timing belt are set previously, and based on the respective results as to whether the angle of rotation of the timing belt exceeds each of the respective preset maximum angles, a discrimination is determined between existence and nonexistence of an abnormality.

16. A method claimed in claim 14, wherein in the reverse rotation step, the normal rotation step and the retracting and fixing step, the tension pulley is controlled to be advanced and retracted with respect to said timing belt so that the pressure of the tension pulley against the timing belt may be kept at a predetermined value.

17. A method claimed in claim 16, wherein a retracted position of the tension pulley in the reverse rotation step, an advanced position of the tension pulley in the normal rotation step, and a retracted position of the tension pulley in the retracting and fixing step are detected, and a discrimination between existence and nonexistence of an abnormality is determined based on the ascertainment as to whether those positions are changed or not.

18. An apparatus for adjusting the tension of a timing belt in an engine, the engine having an engine body, a crank shaft in the body, on one side of an engine body a driving pulley on the crankshaft, a driven pulley on a camshaft of a valve operating mechanism, an auxiliary pulley, a timing belt bridged over the driving pulley, the driven pulley, and the auxiliary pulley, and a tension pulley for pressing a loose side portion of the timing belt from outside, said apparatus comprising: a jig table movable toward and away from the engine body in an axial direction of the crankshaft, means for moving said jig table, a driving means mounted on the jig table for driving the driving pulley to rotate, a fixing means mounted on the jig table for fixing the driven pulley in position, a pressing means mounted on the jig table comprising a presser for contacting the tension pulley so as to press it against the timing belt and a driving source for moving the presser back and forth, a tightening means mounted on the jig table for tightening and loosening a fixing bolt which fastens the tension pulley, and a tension measuring means mounted on the jig table comprising a second presser engageable under a predetermined pressure force with a substantially central portion of a tension side portion of the timing belt and a detector for detecting displacement of the second presser.

19. An apparatus claimed in claim 18, wherein the tension measuring means comprises an attachment plate provided with a pair of touch rollers for engaging the driving pulley and the driven pulley respectively, the second presser being mounted on the attachment plate and movable toward and away from the tension side portion of the timing belt, a load cell mounted on the attachment plate for detecting the pressure force of the second presser against the timing belt, a driving source for moving said second presser back and forth in response to a signal from the load cell so as to keep the pressure force of the second presser at a predetermined value, and the detector is mounted on the attachment plate.

20. An apparatus claimed in one of claims 18 or 19, wherein the pressing means is provided with a second load cell for detecting a pressure force of the tension pulley against the timing belt and controlling an operation of the driving source for moving the presser, and a second detector for detecting a position of the tension pulley.

21. An apparatus claimed in any one of claims 18 or 19 wherein the driving means is provided with a third detector for detecting an rotation angle of the driving pulley.

22. An apparatus claimed in claim 21, wherein said fixing means is provided with a pair of locking fingers which are insertable into an circumferentially elongated engaging hole made in the driven pulley and are movable to close and open in the longitudinal direction of the hole and means for opening and closing said pair of locking fingers.

23. An apparatus claimed in any one of claims 18 or 19 wherein said fixing means is provided with a pair of locking fingers which are insertable into an circumferentially elongated engaging hole made in the driven pulley and are movable to close and open in the longitudinal direction of the hole and means for opening and closing said pair of locking fingers.

24. An apparatus claimed in claim 20, wherein the driving means is provided with a third detector for detecting an rotation angle of the driving pulley.

25. An apparatus claimed in claim 24, wherein said fixing means is provided with a pair of locking fingers which are insertable into an circumferentially elongated engaging hole made in the driven pulley and are movable to close and open in the longitudinal direction of the hole and means for opening and closing said pair of locking fingers.

26. An apparatus claimed in claim 20, wherein said fixing means is provided with a pair of locking fingers which are insertable into an circumferentially elongated engaging hole made in the driven pulley and are movable to close and open in the longitudinal direction of the hole and means for opening and closing said pair of locking fingers.

* * * * *